March 19, 1957 D. B. SHEPP 2,785,709
WORK CLAMPING ATTACHMENT FOR ROTARY SAW MITER GAGE
Filed Oct. 7, 1955 3 Sheets-Sheet 3
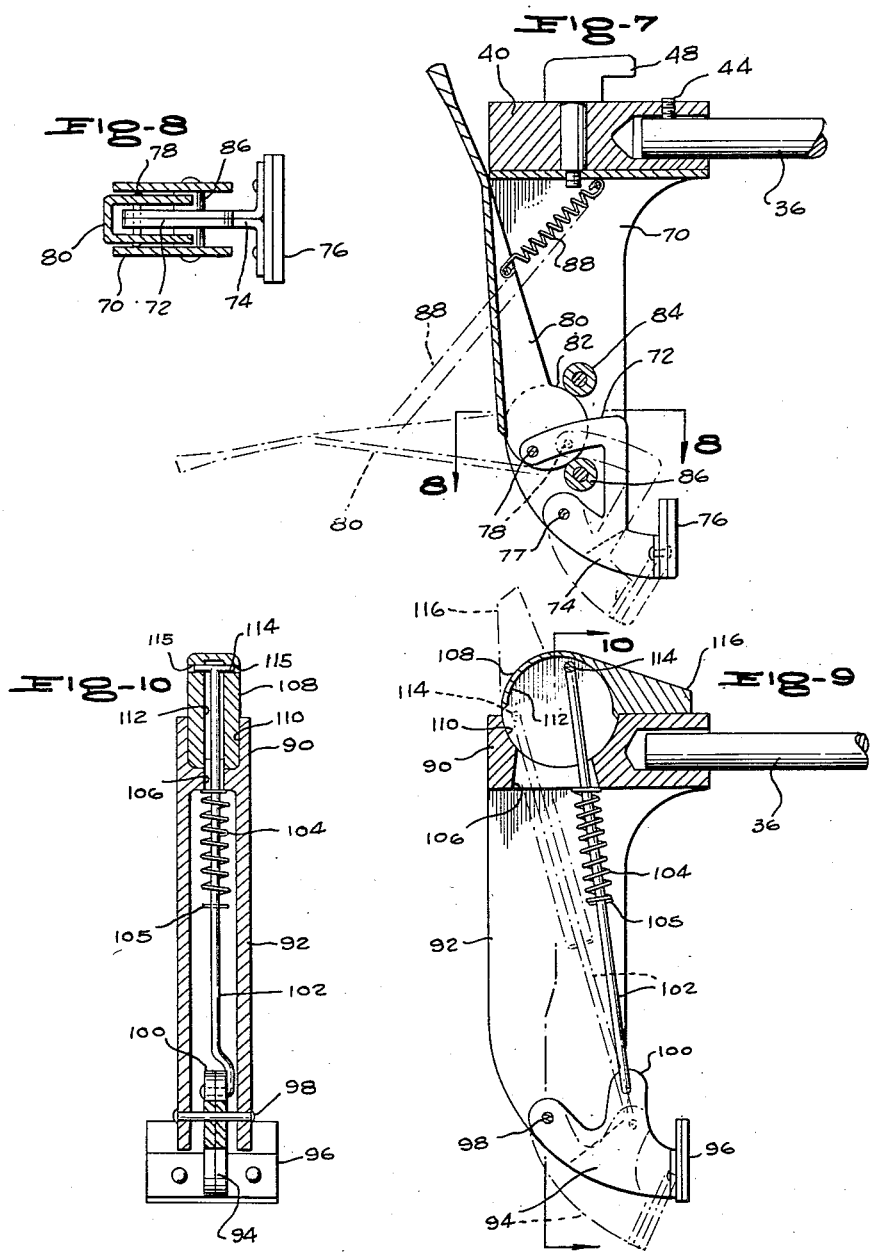
INVENTOR.
DALE B. SHEPP
BY
McMorrow, Berman + Davidson
ATTORNEYS United States Patent Office 2,785,709
Patented Mar. 19, 1957

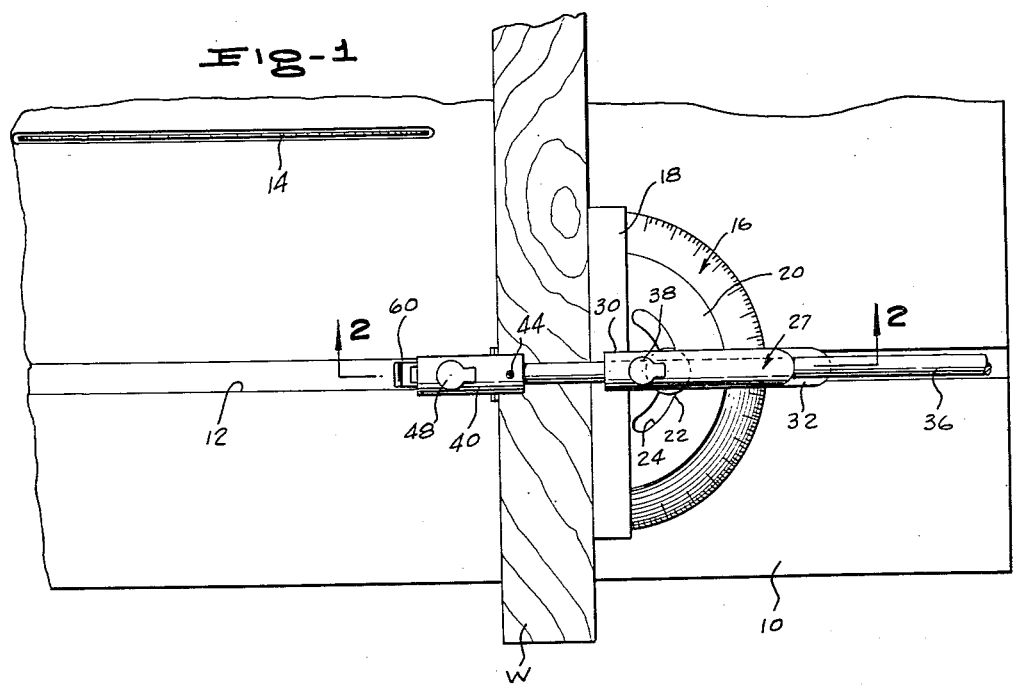
March 19, 1957 D. B. SHEPP 2,785,709
WORK CLAMPING ATTACHMENT FOR ROTARY SAW MITER GAGE
Filed Oct. 7, 1955 3 Sheets-Sheet 1
INVENTOR.
DALE B. SHEPP

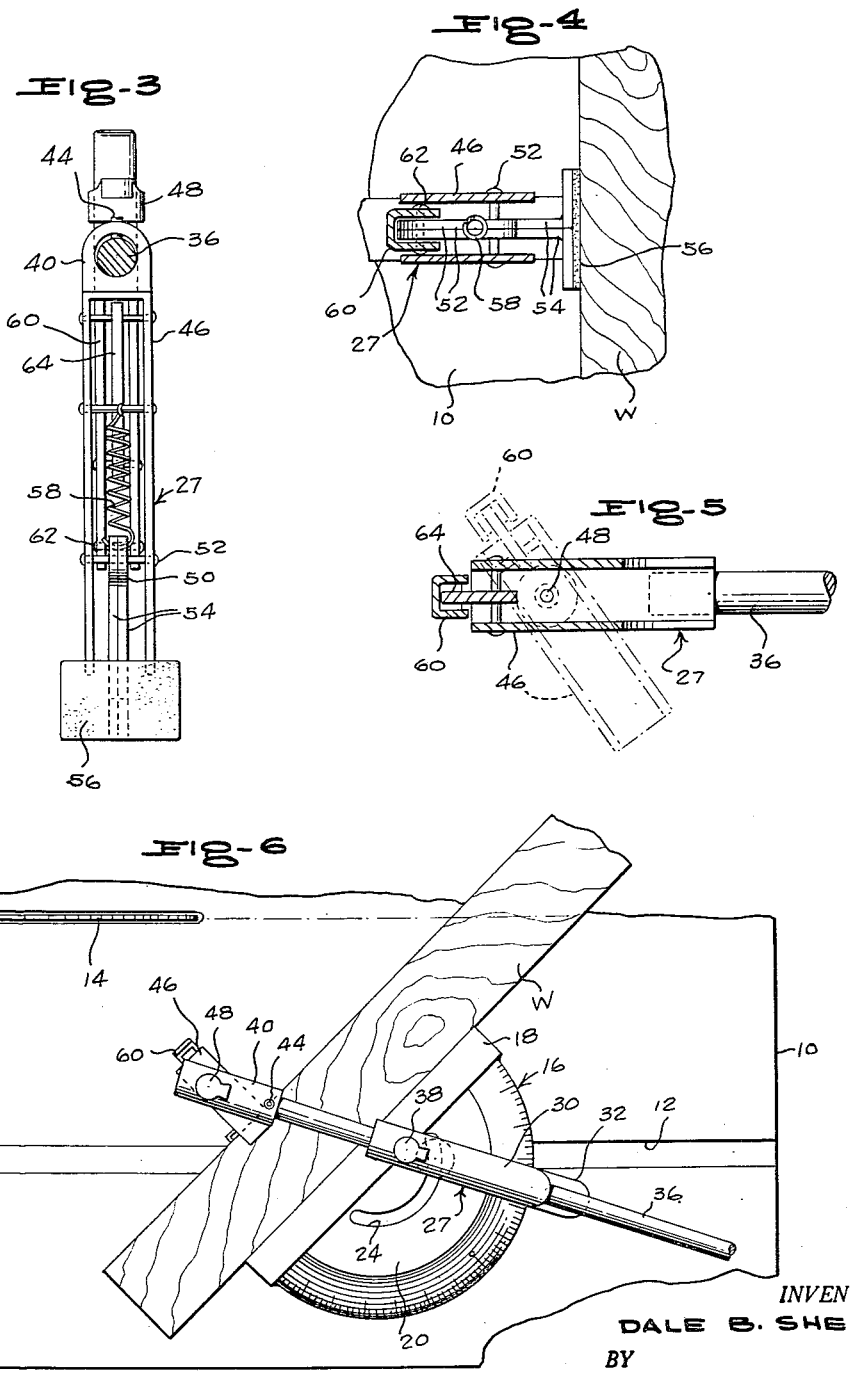

2,785,709

WORK CLAMPING ATTACHMENT FOR ROTARY SAW MITER GAGE

Dale B. Shepp, Parma, Ohio

Application October 7, 1955, Serial No. 539,107

3 Claims. (Cl. 143—52)

The present invention, a work clamping or locking device adapted to be mounted upon the conventional miter gage of a power saw such as a circular saw, is intended to securely lock the work in position against the usual work-contacting abutment of the miter gage, so that the work will be held at proper angularity to the saw blade while being fed thereto, without requirement so far as the user is concerned of gripping the work under conditions which are not only fatiguing but also hazardous.

In general, table-mounted circular saws are provided with miter gages, said miter gages being slidably mounted upon the table in proximity to the saw blade, and being formed with upstanding abutments or guides, against which the board or other work being cut is manually held by the user. In use of a table mounted power saw of this type, the user, after adjusting the miter gage to a selected position, locks the miter gage in said position, positions the work against the guide, which will have been correspondingly angularly adjusted relative to the plane of the cutting blade, and then feeds the miter gage, guide, and work toward the saw blade for the purpose of making a cut in the work at the selected angle.

This particular characteristic of power saws is undesirable, in view of the fact that the worker must firmly grip the work piece manually, holding it tightly against the guide, with his hand disposed, in many instances, dangerously close to the saw blade. Alternatively, the work might be clamped directly to the saw table but this is an inconvenient arrangement, in most instances.

The main object of the present invention is to provide an improved work clamp for power saws, wherein the work is secured directly, by a mechanism including a pistol grip handle so disposed as to locate the operator's hand safely behind the miter gage while the work is being fed to the saw blade. I am aware, in this regard, that it has been heretofore proposed to provide a work engaging clamp for angularly adjustable saw guides, and the present invention does not encompass the provision of any and all work clamps carried by miter gages of power saws. Rather, the invention comprises an improved construction in a clamp falling within this broad category, such that the clamp can be swiftly attached to a wholly conventional miter gage already in use, without modification or redesign of said miter gage in any way.

Another object of importance is to provide a device as stated which will be characterized by the swiftness and ease with which the device can be operated to either clamp a piece of work to a miter gage work guide, or disengage the work from said guide. By reason of this arrangement, it is proposed to facilitate the swift attachment of a work piece to the miter gage, following the cutting of a preceding work piece, and it is proposed to further facilitate the removal of any work piece after the same has been cut, to permit attachment of a new work piece, thus promoting rapid cutting of a plurality of work pieces with minimum difficulty so far as the operator is concerned.

Another object of importance is to provide a device of the nature referred to so designed as to effect a secure clamping of the work piece, in any position to which the miter gage may be angularly adjusted relative to the saw blade.

Another object is to form the miter gage work clamping attachment in such a manner as to permit any of various work pieces falling within a wide range of different thicknesses and lengths, to be swiftly and easily clamped to the gage.

A further object of importance is to provide a device as stated which will promote maximum safety, by necessary disposition of both hands of the operator behind the gage, with one hand operation of the work feeding fixture being permitted once the work has been locked to the gage.

Other objects of importance are to provide a clamping attachment that will permit the operator to use the full depth of cut of the saw blade, that will be readily adapted, at low manufacturing cost, to fit any of a large number of saws of the general type referred to, and that will hold even very small work pieces.

Other objects and advantages will appear from the following description, the claims appended thereto, and from the annexed drawings in which like reference characters designate like parts throughout the several views and wherein:

Figure 1 is a fragmentary top plan view of a saw table and miter gage, and of a clamping attachment formed in accordance with the present invention, as it appears when in use;

Figure 2 is a longitudinal sectional view through the device on line 2—2 of Figure 1, the dotted lines showing the device in unlocking position and the full lines showing the same in locking position;

Figure 3 is a transverse sectional view, on an enlarged scale, on line 3—3 of Figure 2;

Figure 4 is a plan sectional view, also on an enlarged scale, on line 4—4 of Figure 2;

Figure 5 is a sectional view, on an enlarged scale, on line 5—5 of Figure 2, the dotted lines showing one position to which the work engaging means can be angularly adjusted;

Figure 6 is a view similar to Figure 1 in which the work has been adjusted with the gage and clamping device to a position for making an oblique cut therethrough;

Figure 7 is a fragmentary longitudinal sectional view through a modified form of the device, the dotted and full lines showing the same in unlocking and locking positions respectively;

Figure 8 is a sectional view on line 8—8 of Figure 7;

Figure 9 is a view similar to Figure 7 showing another modification; and

Figure 10 is a transverse sectional view on line 10—10 of Figure 9.

In the form of the invention shown in Figures 1–2, the clamping device is shown in association with a conventional table-mounted rotary power saw including a flat saw table 10 having a wide, elongated feed slot 12 paralleling a rotary saw blade 14. At 16 there has been shown a conventional miter gage mounted upon the table for angular adjustment relative to the plane of the saw blade, and for movement along the length of the slot 12 during the feeding of a work piece W through the blade. The miter gage includes the usual upstanding work-contacting guide 18, rigid with a protractor segment 20, and a miter gage lock screw 22 extends through an arcuate slot 24 formed in the segment, for the purpose of locking the miter gage in selected positions to which it is angularly adjusted relative to the saw blade. Normally, after the gage is locked in this manner, the work W is positioned against the guide 18 in the manner shown in Figure 1, and then the gage and the work are bodily shifted longitudinally of the slot 12, to feed the work to the blade.

Disposed adjacent the degree-marked scale of the miter gage is an index arm 26, facilitating the adjustable positioning of the gage preliminary to locking of the same.

The device constituting the present invention has been generally designated at 27, and constitutes an attachment to the conventional miter gage illustrated. The device includes a support bracket 28, formed from a length of strap metal or the like, said bracket being so shaped as to overlie the protractor segment of the gage, and project upwardly from the guide 18. The bracket 28, in the illustrated example, is of approximately L-shaped configuration, but it will be understood that the illustrated shape is provided only for the purpose of mounting the device upon the particular miter gage shown. Other miter gages of different formations would involve the use of differently shaped brackets 28. However, as will presently appear, to adapt the device for mounting on any of various miter gages in present day use, only the bracket 28 need be modified, and the remaining parts of the device remain unchanged, thus simplifying manufacture to a marked degree and further permitting use of the device on a large number of miter gages without any modification or redesign of said gages.

The bracket 28, on the lower, horizontal leg thereof, has an opening receiving the screw 22, and accordingly, when the screw 22 is turned home, the device will be securely locked to the miter gage, and will not turn relative to the miter gage, due to the engagement of the upstanding leg of the bracket with the work guide 18.

At its upper end, the bracket 28 is secured to the forward end of a horizontally disposed sleeve or barrel 30 formed at its rear end with a depending pistol grip handle 32 secured to the outer end of the horizontal leg of the bracket. Sleeve 30 has an end to end bore 34, and axially slidable within said bore is a support bar 36 adapted to be clamped to the sleeve in selected positions of angular adjustment by means of a set screw 38.

At its forward end, bar 36 supports an elongated block 40, having a rearwardly opening recess 42 receiving the forward end of bar 36, a set screw 44 fixedly engaging the block with the bar 36.

Depending from the block 40 is a clamp frame 46 of inverted U-shape in cross section, rotatably adjustable upon the block upon a screw 48 extending normally to the axis of bar 36, the screw being adapted to be turned home for the purpose of holding the clamp frame in selected positions to which it is rotatably adjusted.

The clamp frame is provided with transversely spaced, vertically disposed support plates, and disposed between the lower ends of said plates is a work-engaging arm 50 pivotally mounted at 52 upon the frame, through the medium of a pin extending transversely between the depending plates of said frame. Arm 50, at its upper end, has an inwardly projecting extension receiving the pivot pin 52, said extension merging into a curved body portion of the arm, curving through substantially ninety degrees as shown in Figure 2. At its free end, the curved body portion is provided with a transversely disposed cross head, covered by a facing 56 of roughened, friction-producing material adapted to engage against the adjacent surface of the work W, thus to clamp the work W between the arm 50 and the work guide 18.

Tensioned to normally swing the clamping arm 54 in a clockwise direction about pivot 52, viewing the same as in Figure 2, is a contractile spring 58 connected between the upper ends of the arm and the clamp frame, said spring when contracting being adapted to exert a pulling force on the clamping arm tending to swing the same from the full to the dotted line positions of Figure 2, the dotted line position being a work-releasing one.

A clamp handle 60, of elongated formation, is pivotally connected at 62 to the arm 54, at the location of the bend in said arm. A leg 64, pivotally connected at its upper end to the clamp frame adjacent block 40, is pivotally connected at 66, at its lower end, to the handle 60 intermediate opposite ends of the handle and has a lateral projection 68 limiting swinging movement of the handle beyond the full line position thereof shown in Figure 2.

In use of the form of the invention shown in Figures 1–6, and assuming first that the work is to extend with its length perpendicular to the plane of the cutting blade, to make a straight cut across the work normal to the work piece length (as in Figure 1), the miter gage is first adjusted to the selected position relative to the saw blade, and the miter gage and work clamping attachment locked in said position by means of the screw 22. The set screw 38 is loosened as necessary to adjust bar 36 axially, to accommodate the device to a workpiece W of a particular thickness, and bar 36 is clamped in the desired position of axial adjustment thereof.

With the parts in the dotted line position shown in Figure 2, it is merely necessary to swing the handle 60 to the full line position thereof. The handle pivots about the axis of its connection 66 to link 64, and link 64 swings inwardly of the clamp frame, together with the handle. This causes the connection 62 of the handle to be swung downwardly, and clamping arm 50, pivoting about the axis 52, swings forwardly into locking engagement with the work W. It will be understood that the forward swinging movement of the handle 60 can be through a sufficient distance to move the pivot axis 66 past a dead center, that is, past a straight line drawn between the pivotal connection 62 and the upper pivot point of link 64.

With the work now securely clamped to the guide 18, the handle 32 may be grasped with one hand, and the workpiece fed to the saw blade 14. It will be observed that the hand grasping the handle 32 is disposed fully behind the miter gage, where there will be no possibility whatever of injury during the feeding of the work.

After the cut has been made, the handle 60 is thrown to the dotted line position of Figure 2, and this pulls the arm 50 away from the work piece, the spring 58 contracting to retain the handle, link, and clamping arm in their released, dotted line position of Figure 2.

In Figure 6, the device is shown in use during the cutting of a work piece obliquely to the length of said piece, that is, during the making of a miter cut. The operation hereinbefore described remains completely unchanged, with the exception that the clamping frame 46 is rotatably adjusted about the axis of screw 48, so as to remain in a plane normal to the length of the work piece, to exert a full clamping action thereon in the same manner as in Figure 1. The screw 48 is turned home for the purpose of locking the clamping frame in the selected position of rotatable adjustment, and the feeding of the work progresses in the manner previously described.

In Figure 7 and Figure 8 there is shown a modified form which is similar in all respects to the first form of the invention, with the exception of the clamping frame and the articulated clamping linkage carried by said frame. Thus, instead of a clamping frame 46 connected to the block 40, there is connected to said block a clamping frame 70. This is also of inverted U-shape in cross section, and at its lower end carries a clamping arm 72 provided at its free end with a work-engaging cross head 76 mounted upon a relatively short, arcuate body portion 74 of the arm. The body portion 74, intermediate its ends, is integral with an angular extension of approximately inverted L-shape, and at the end of the body portion remote from the cross head 76, said body portion is fulcrumed upon the frame 70 by means of a pin 77.

The end of the angular extension remote from body portion 74 is pivotally connected at 78 to a handle 80 having at its inner end a circular enlargement 82. The pivotal connection 78 is located eccentrically to the center of enlargement 82, and enlargement 82 is rotatably supported against vertically spaced rollers 84, 86 connected between the depending legs of the clamp frame.

Connected between the upper end of the clamp frame and the intermediate portion of handle 80 is a contractile spring 88, tending to shift the linkage to a work-clamping position shown in full lines in Figure 7.

In this form of the invention, the handle 80, when thrown to the dotted line position of Figure 7, causes rotation of enlargement 82, and this in turn shifts the pivot point 78 forwardly. As a result, the work clamping arm 72 is pivoted upon its axis 77 in a clockwise direction, viewing the same as in Figure 7, shifting the cross head 76 out of engagement with the work. When the work has been properly positioned, release of the handle 80 effects return thereof under the pull of spring 88 to the full line position of Figure 7, causing the cross head to be forced against the face of the work to clamp the work to the guide.

In the form of the invention shown in Figures 9 and 10, the support block and clamping frame are integrally constituted, the support block 90 having depending, transverse, plate-like legs 92 constituting the frame. The work clamping arm 94 has a work-engaging cross head 96, and is pivoted at 98 upon the lower end of the frame. Intermediate the opposite ends of the arm, there is formed thereon an upwardly projecting extension 100 pivotally connected to the hook-shaped lower end of an elongated link or connecting rod 102.

The spring 104 is held under compression between the underside of block 90 and a cross pin 105 extending through the intermediate portion of the connecting link, and when free to expand, exerts a downward pressure on the connecting link in an axial direction, tending to swing the work clamping arm 94 to the dotted line position thereof shown in Figure 9.

The upper end portion of the connecting rod extends through a slot formed in the block 90, said slot being designated at 106. Above the slot, there is rotatably supported by the block a disc 108, rotating in a semi-circular recess 110 opening upon the upper surface of the block and communicating at its bottom with slot 106. The disc 108 is formed with a downwardly opening recess 112, and the upper end portion of the link 102 extends into recess 112. At its upper extremity, the link has a cross piece 114 comprising trunnions rotatably engaged in transverse openings 115 of the discs. The openings communicate with recess 112 as shown in Figure 10, and are disposed eccentrically to the axis of rotation of the disc.

Integrally formed upon the upwardly projecting portion of the disc is a tapered handle 116 extending approximately radially of the disc and overlying block 90.

When the handle 116 is thrown upwardly to the dotted line position shown in Figure 9, disc 108 is rotated in a counterclockwise direction, viewing the same as in Figure 9, and this causes the upper extremity of the connecting link 102 to travel through an arcuate path from the full to the dotted line position shown in Figure 9. This causes the link to be shifted downwardly, the link ultimately reaching the dotted line position of Figure 9. Downward movement of the link in turn imparts downward swinging movement to the arm 94, shifting the cross head 96 out of engagement with the work. The spring 104 aids in the downward movement of the link, so that no more than a light upper pressure on the handle 116 is necessary, to impart the initial rotatable movement to the disc, the expansion of the spring then resulting in the further rotatable movement of the disc to its final position.

To clampably engage arm 94 with the work, the handle 116 is thrown from the dotted to the full line positions of Figure 9, and movement beyond the full line, locking position of the parts is prevented by engagement of the underside of the handle against the upper surface of the block 90.

In all forms of the invention, the device includes a handle constituting a part of an articulated clamping linkage, throw of the handle in one direction being adapted to shift a work clamping arm into engagement with the work piece, and throw of the handle in an opposite direction shifting the clamping arm away from the workpiece to release the same. Further, in every form the device has a handle disposed behind the miter gage, which handle can be grasped to shift the workpiece, miter gage, and clamping attachment in the direction necessary to feed the work to the saw blade, without danger of injury so far as the user is concerned.

A still further important characteristic of the invention resides in the fact that the device does not require modification or redesign of the miter gage in any way, regardless of the particular make and type of miter gage. Still further, the device is adapted to fit any miter gage merely by suitable modification of a single, inexpensive element, namely the support bracket 28.

It is believed apparent that the invention is not necessarily confined to the specific use or uses thereof described above since it may be utilized for any purpose to which it may be suited. Nor is the invention to be necessarily limited to the specific construction illustrated and described, since such construction is only intended to be illustrative of the principles it being considered that the invention comprehends any minor change in construction that may be permitted within the scope of the appended claims.

What is claimed is:

1. A workpiece clamping attachment for a miter gage of a table-mounted power saw, said gage having a work guide at the front thereof, comprising: a support bracket connectable to and extending upwardly from said gage; a sleeve fixedly connected to the upper end of said bracket; a handle disposed behind said miter gage and rigid with said sleeve and bracket for feeding the gage, guide, and work-piece in a direction to effect a cut in the work-piece; a bar extending through and projecting forwardly from said sleeve so as to project beyond the guide; a depending frame carried by the forward end of the bar; and clamp means carried by the frame and including a work-clamping arm swingable toward and away from the bracket for releasable clamping of the workpiece by and between the guide and arm, said arm being axially adjustable within the sleeve for locating the clamp means selected distances from said guide.

2. A workpiece clamping attachment for the miter gage of a table mounted power saw, said gage having a work guide at the front thereof, comprising: a support bracket connectable to and extending upwardly from said gage; a sleeve fixedly connected to the upper end of said bracket; a handle rigid with said sleeve and bracket for feeding the gage, guide, and workpiece in a direction to effect a cut in the workpiece; a bar extending through and projecting forwardly from said sleeve so as to project beyond the guide; a block supported by the forward end of the bar; a depending frame carried by the block; a work-clamping arm swingably mounted on the frame for movement toward and away from the bracket for releasable clamping of the workpiece by and between the guide and arm; means connected with the arm and with a member of the frame and block for swingably adjusting the arm toward and away from the bracket and locking it in the toward position, said bar being axially adjustable within the sleeve for locating the block and frame selected distances from said guide; and means carried by the sleeve adapted to lock the bar to the sleeve in selected positions to which the bar is axially adjusted.

3. A workpiece clamping attachment for the miter gage of a table mounted power saw, said gage having a work guide at the front thereof, comprising: a support bracket connectable to and extending upwardly from said gage; a sleeve fixedly connected to the upper end of said bracket; a handle rigid with said sleeve and bracket for feeding the gage, guide, and workpiece in a direction to effect a cut in the workpiece, said sleeve extending in a substantially horizontal direction transversely of the guide and having a rear end projecting rearwardly of the miter gage, the handle being on the rear end of the sleeve so as to be disposed in back of the miter gage during feeding of the workpiece in said direction; a bar extending through and projecting forwardly from said sleeve so as to project beyond the guide; a block supported by the forward end of the bar; a clamping frame depending from the block; a work-clamping arm swingably mounted on the frame for movement toward and away from the bracket for releasably clamping the workpiece by and between the guide and arm; a handle having a connection with the arm and with a member of the block and frame adapted for swingably adjusting the arm toward and away from the bracket and locking it in the toward position, said bar being axially adjustable within the sleeve for locating the block and frame selected distances from said guide; and means carried by the sleeve adapted to lock the bar to the sleeve in selected positions to which the bar is axially adjusted.

References Cited in the file of this patent

UNITED STATES PATENTS

| | | |
|---|---|---|
| 160,960 | Rydbeck | Mar. 16, 1875 |
| 438,029 | Strahl | Oct. 7, 1890 |
| 1,894,010 | Tautz | Jan. 10, 1933 |
| 2,349,133 | Benton | May 16, 1944 |
| 2,490,923 | Sasgen | Dec. 13, 1949 |
| 2,752,960 | Poeltl | July 3, 1956 |
| 2,759,503 | Goldschmidt | Aug. 21, 1956 |